United States Patent [19]
Newbould

[11] 3,846,912
[45] Nov. 12, 1974

[54] INDEXING MECHANISM
[76] Inventor: Richard J. Newbould, 443 S. Union Ave., Kenilworth, N.J. 07016
[22] Filed: Dec. 13, 1972
[21] Appl. No.: 313,821

Related U.S. Application Data
[63] Continuation-in-part of Ser. No. 211,366, Jan. 10, 1972, abandoned.

[52] U.S. Cl. ............... 33/1 D, 33/174 TD, 74/527, 74/813 R
[51] Int. Cl. ............................................ B23q 17/04
[58] Field of Search..... 33/174 TD, 1 D; 74/813 NI, 74/527

[56] References Cited
UNITED STATES PATENTS
2,452,544  11/1948  Brodie .............................. 33/1 D
3,699,844  10/1972  Perminov ...................... 33/174 TD Primary Examiner—William D. Martin, Jr.

[57] ABSTRACT

An indexing mechanism for angular or linear division combining the principles of interlocking teeth, the vernier and the ratchet. Two discs or linear plates having a plurality of interlocking surfaces of different pitches, are joined by a third disc or plate, having a set of interlocking surfaces to match the pitches of the other two. Some of the pitches are not evenly divisable into a circle and do not extend completely around the discs, and a ratcheting type movement is used to accomplish the desired indexing.

8 Claims, 12 Drawing Figures

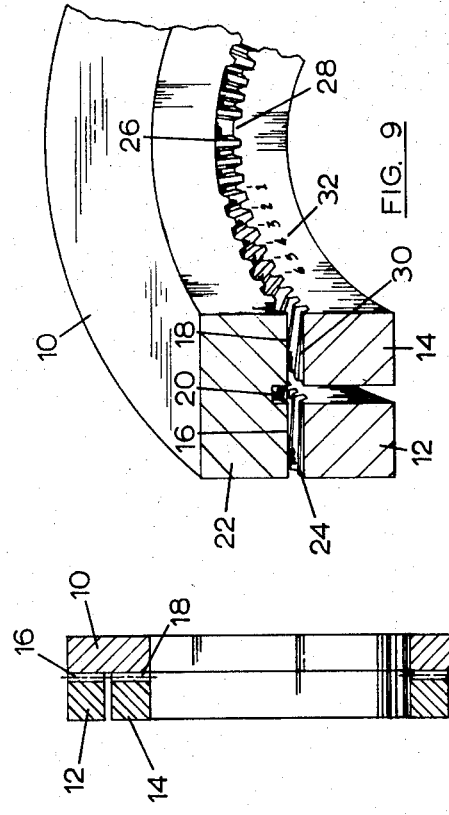
FIG. 9
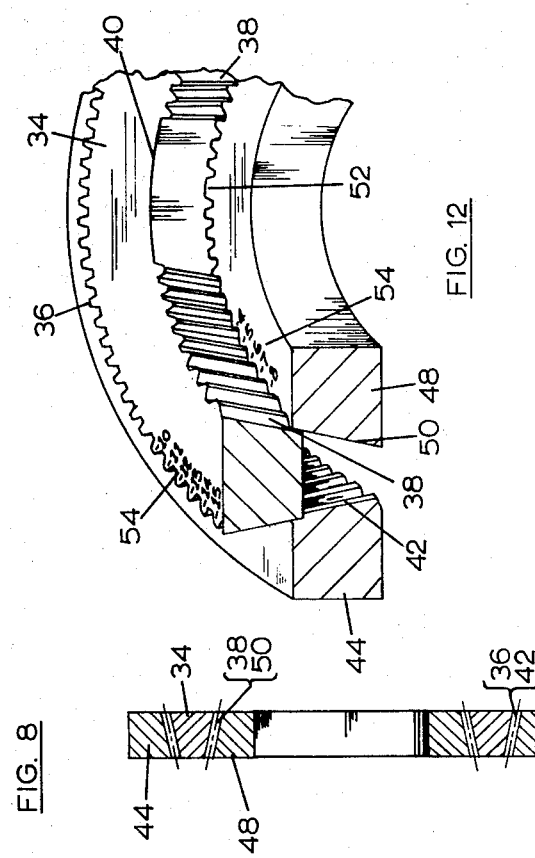
FIG. 12
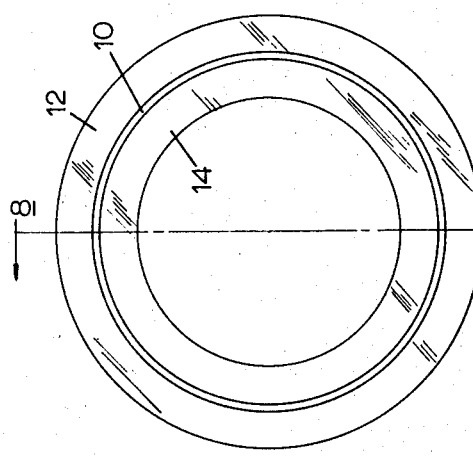
FIG. 8
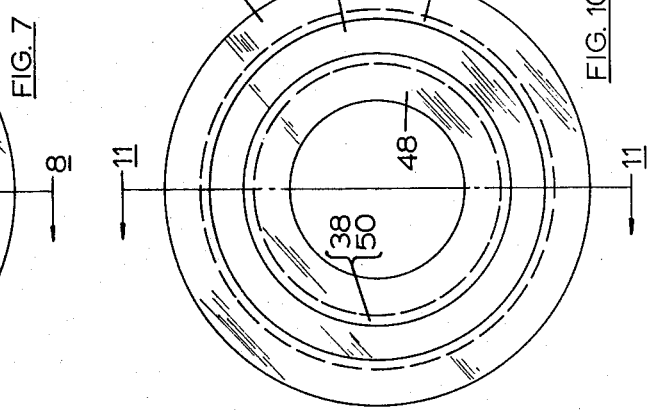
FIG. 11
FIG. 7
FIG. 10

INDEXING MECHANISM

This application is a continuation-in-part of application Ser. No. 211,366, filed Jan. 10, 1972, now abandoned.

BACKGROUND OF THE INVENTION

Locking indexing mechanisms for linear and especially angular divisions can be used in the field of geometric instruments, work, and tool holding devices.

In the prior art can be found many examples of the advantages of interlocking surfaces, usually in the form of wedge shaped teeth, for positioning two pieces relative to each other. The principles of the vernier in mechanical locking form is also common, as in U.S. Pat. No. 2,452,544 in the name of Brodie, granted Nov. 2, 1948 and German Patent No. 1,184,094, granted Aug. 26, 1965. The major problem encountered in using these vernier actions is that they use indicia which are evenly divisable into a circle, and a mechanical construction which prohibits closely spaced locking methods. The result is that movement is in fractions of a circle rather than in even degrees, minutes, and seconds, or decimals, thereby requiring mathematics, often many steps, and usually a well trained operator. By adding the back and forth movement of a ratchet pawl to vernier spaced teeth, I can disregard pitches which are evenly divisable into a circle or to a given length, and produce a mechanism having relatively movable parts or members which can be randomly located relative to each other at any desired angular or decimal position, with no mathematical calculation, quickly and simply by an inexperienced person. I believe my combination of interlocking teeth, with vernier spacing which is not evenly divisable into a circle, and the use of a ratcheting movement is a novel combination of these well know principles.

SUMMARY OF THE INVENTION

It is the principal object of the present invention to employ a plurality of similar, relatively movable circular members or linear plates having a series of meshing teeth provided respectively between the immediately adjacent surfaces of said members or plates, certain of said sets of teeth being spaced in a vernier manner, by employing on at least one of said members or plates pitches of said teeth which are not evenly divisable into a circle or to a given length, having corresponding indicia formed thereon which are readily visibly readable directly, without requiring reference to charts, or tables, etc., whereby a mechanism is provided in which the relatively movable members thereof can be located randomly at any desired angular or decimal position, with no mathematical calculation, the operation being quick and simple and capable of being performed even by an inexperienced operator.

It is another object of the invention to provide an indexing mechanism of the foregoing type in which a ratcheting and camming effect is utilized to achieve the ultimate, desired final positioning, for example, of an element carried by one of said relatively movable members with respect to a base reference.

It is a further object of the invention to utilize the inter-meshing wedge shaped teeth on the various members to effect interlocking of said members with respect to each other and thereby securely maintain a desired angular setting of the type referred to above.

It is still another object of the invention to provide a series of said relatively movable members for relative rotation about axis normal to the planes of said members, said members being adapted to be separated in an axial direction to permit relative, independent and desired positioning of said members relative to a base reference indicia in order that initial major divisions of an angle may be provided by the position of one of said members, smaller divisions of the selected angle being provided by another one of said members, and a still smaller division of said angle being provided by a third member, while the final clamping of all of the relatively adjusted members results in a camming action of the inter-meshing wedge shaped teeth to achieve the desired, precise indexed angle of a supported element relative to said base reference.

It is still a further object of the invention to provide surfaces on the relatively movable members upon which scales are provided for readily visible observation to aid in disposing said various members with respect to a base datum reference prior to the members being clamped together to achieve the final setting of a desired angle.

It is a further object of the invention to provide a mechanical construction of the said indexing mechanism which is simple and sound.

Details of the foregoing objects and of the invention, as well as other objects thereof, are set forth in the following specifications and illustrated in the accompanying drawing comprising a part thereof.

BRIEF DESCRIPTION OF THE DRAWING

FIG. 7 is a bottom view of another embodiment of the invention comprising an annular adaptor ring having concentric first and second sets of teeth thereon, the first set being continuous and the second set being interrupted and of a different pitch from the first set, and a pair of concentric rings having sets of teeth thereon respectively complementary to said first and second sets of teeth on said adaptor ring and are adapted to mesh therewith.

FIG. 8 is a transverse sectional view of the embodiment of the invention shown in FIG. 7 as seen on the line 8—8 thereof.

FIG. 9 is a fragmentary perspective view of the embodiment of the invention shown in FIGS. 7 and 8.

FIG. 10 is a view similar to FIG. 7 but showing a still further embodiment of the invention from those in the preceding figures and in which the adaptor ring is annularly frustoconical and concentric with and between a pair of additional rings, the adaptor ring having sets of teeth of different pitches respectively on opposite curved sides thereof, one of said sets being interrupted, and the other rings each having a set of teeth thereon having pitches respectively corresponding to and meshing with the sets of teeth on said adaptor ring.

FIG. 11 is a transverse sectional view of the embodiment shown in FIG. 10, as seen on the line 11—11 thereof.

FIG. 12 is a fragmentary perspective view of the embodiment of the invention shown in FIGS. 10 and 11.

DETAILED DESCRIPTION

It will be understood that the various discs, 1, 2, 3 and 4 may be of any practical dimension both in regard to diameter and thickness, depending upon the instrument or mechanism in which the principles of the invention are to be employed. Therefore, the specific illustrations of the teeth upon the various faces of said discs are to be considered solely as exemplary rather than illustrative of a particular pitch of the teeth in any particular set of the meshing teeth between the various discs.

Figure 5:
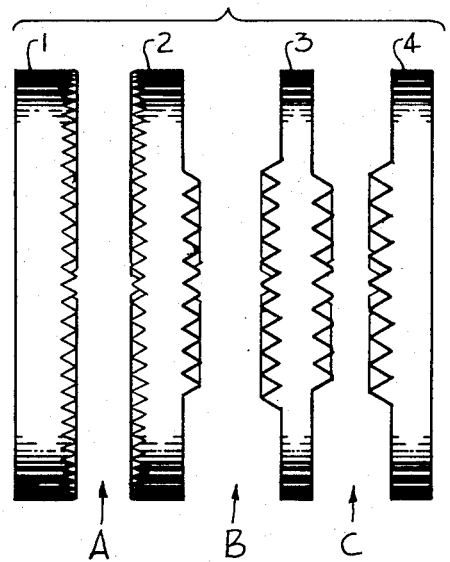
FIG. 5 is an axially exploded view of the arrangement of discs shown in FIGS. 1-3 to illustrate the discs in unmeshed positions.
Figure 6:
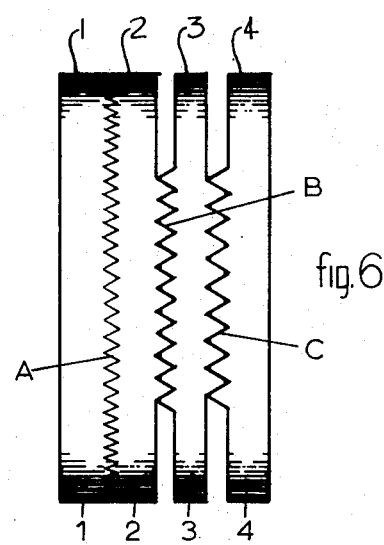
FIG. 6 is a view similar to FIG. 5 in which the discs illustrated in FIG. 5 are compressed into meshing relationship and also illustrating the clearance portions of certain of said discs.

It also is to be understood that the discs shown in the various Figures and particularly FIGS. 5 and 6 can be mounted upon a suitable axial member, not shown, such as a post or spindle provided on a carriage in a milling machine. Disc or member 4, for example, could be stationarily connected to to such carriage, for example, and the zero indicia thereon is a reference datum. Appropriate means, also not shown, but of a conventional nature, could be connected to disc 1 for purposes of supporting an appropriate cutting tool or the like which is to be disposed at a predetermined angle with respect to the zero reference datum on disc 4, for example.

Figure 4:
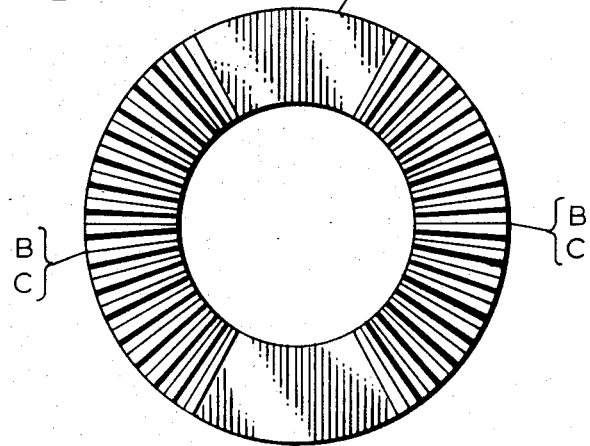
FIG. 4 is an exemplary plan view of one face of one of the discs shown in FIGS. 1-3 to illustrate the general configuration of the teeth on one surface of said member, such illustration of the teeth being solely illustrative to show clearance areas on a disc to accommodate the teeth of a cooperating disc upon which the pitch of the teeth is not evenly divisible into a circle.

For purposes of providing a specific illustration of one arrangement of pitches for the various sets of teeth disposed on the opposing faces of the discs shown in the various figures, the following is set forth as an exemplary system of operation of the various discs to achieve the desired setting of an angle with respect to the zero datum point on disc 4. In this exemplary description and illustration, it will be seen that 4 discs are provided. Additional discs may be employed, as described hereinafter, for further purposes. Initially considering, however, the arrangement of the 4 discs, the pitch of the teeth on the mating surfaces between discs 1 and 2 is illustrated in exemplary manner as being 1 degree. Therefore, there will be 360 teeth arranged circularly designated as pitch A in FIG. 5, extending in a radial manner, as illustrated in FIG. 4. The meshing teeth between discs 2 and 3 have been illustrated as having a pitch of 1 degree and 1 minute, designated as pitch B in FIG. 5. Therefore, the spacing between the respective teeth of pitch B is equal to 1 degree and 1 minute, whereby these teeth will be spaced apart a slightly greater distance than the teeth of pitch A on the meshing surfaces of discs 1 and 2. Further, the pitch of the teeth on the mating surfaces of discs 3 and 4 have been selected so as to be spaced apart a distance of 1 degree, 1 minute and 1 second, designated as pitch C in FIG. 5. Therefore, it will be seen that these teeth are spaced apart a still further slightly greater distance than the teeth on the meshing surfaces between discs 2 and 3.

Figure 1:
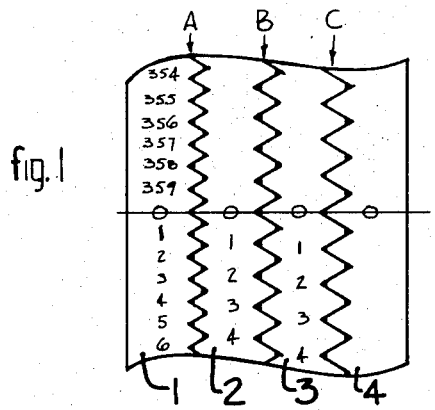
FIG. 1 is a fragmentary elevation of the edge portions of a four disc set illustrating the relative position of said discs when disposed at a zero starting position and further showing a datum line which remains stationary while the other discs are movable relative thereto and to each other.
Figure 2:
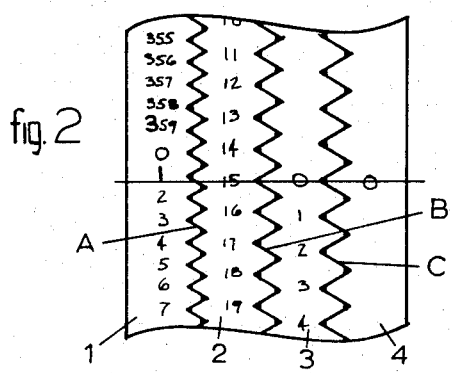
FIG. 2 is a view similar to FIG. 1 but showing an exemplary relative position of certain of the discs to illustrate an angle setting of 1°15'0 inch.
Figure 3:
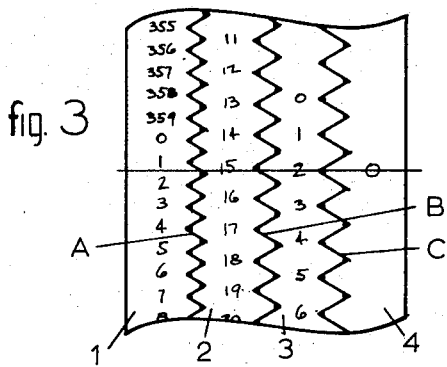
FIG. 3 is a view similar to FIGS. 1 and 2, but showing the relative position of the discs to indicate an angle of 1°15'2 inches.

It will be visibly apparent from FIGS. 1–3 that the pitch of these respective sets of teeth is different, said pitch increasing in size from those on disc 1 to those on disc 4, for example. It is essential to the effective operation of this mechanism that at least one of the pitches between a pair of the meshing discs is not evenly divisable into a circle and therefore this necessitates a clearance area to accomodate non-meshing or improperly meshing teeth to allow the necessary movement used in subdividing one of the other pitches. Said clearance areas are adequate to effect subdivision, for example, of one full pitch of the one being subdivided. Once the subdivision has been accomplished, the subdividing disc is returned to its starting position, thereby effecting said aforementioned ratcheting movement.

OPERATION OF THE MECHANISM

Initially, all of the discs are separated in axial direction as indicated in exemplary manner in FIG. 5. From FIGS. 1–3, it will be seen that each of the discs, on the peripheral faces thereof, for example, have scales corresponding to the pitch of the teeth immediately to the right of each individual scale. Thus, for example, the scale of disc 1 indicates individual degrees, the scale of disc 2 indicates individual minutes, and the scale on disc 3 indicates seconds, all of said scales having a zero reference point, as illustrated in FIGS. 1–3 and the base datum reference remains stationary on disc 4.

For example, all of the discs are initially set, following separation thereof, as shown in FIG. 5, so that the zero references thereof are coincident, in a transverse line, parallel to the axis of the discs, with the zero reference datum on disc 4. Depending upon the angle to be set so as to position disc 1 at a desired angular relationship with respect to the base disc 4, for example, disc 1 is rotated to dispose the same with the desired degree of the scale coincident with the zero reference datum of disc 4. Next, assuming that the desired angle has a certain minute value, disc 2 is then rotated to dispose the desired minute reading of the scale thereon in alignment with the zero reference datum of disc 4. Finally, assuming that the desired angle has a value, in seconds, the desired value is determined by rotating disc 3 in the required direction to dispose that value on the scale opposite the zero reference datum of disc 4.

Following the desired disposition of all of the discs as described immediately above, the clamping mechanism referred to above, but not illustrated, is operated to clamp all of the discs in compressed, meshed manner, such as shown in FIG. 6, and also as represented in various ways in FIGS. 1–3. As a result of such meshing, it will be seen that because of the additional settings imposed upon discs 2 and 3, for example, as described above, the meshing of discs 1 and 2 will occur to stabilize the relationship between those two discs. Next, the meshing of discs 2 and 3 will carry the meshed discs 1 and 2 in a forward direction, i.e., upwardly as viewed in FIGS. 1–3, to include the desired fraction of a degree according to the setting of the minute scale on disc 2 incident to said disc meshing with disc 3. Further, in view of the additional setting of the seconds value of the angle according to the positioning of disc 3 with respect to the reference datum on disc 4, the previously meshed discs 1, 2 and 3 will be carried further forward to incorporate the seconds value into the angle incident to the teeth of discs 3 and 4 becoming fully meshed.

Exemplary illustrations of practical examples of such setting to achieve desired angular positions between discs 1 and 4, for example, are illustrated respectively in FIGS. 2 and 3 with reference to FIG. 1 in which all of the scales are set with the zero indicia thereof in transverse alignment with the reference datum of FIG. 4. Referring to FIG. 2, it will be seen that an angle of 1° 15′ 0″ is shown. In view of this, it will be seen that the transverse exemplary reference datum line which extends through the reference datum of disc 4, is positioned between the teeth indicated by the scale indicia 1 and 2 of disc 1 at a location approximately one-fourth of the distance between the apex of said teeth and therefore corresponding to 15 minutes. Similarly, referring to FIG. 3, it will be seen that an angle of 1° 15′ 2″ is shown and with respect to the same, by observing the transverse datum line passing through the meshed teeth between discs 1 and 2, it will be seen that the tooth opposite indicia 1 on the scale of disc 1 is moved upwardly a slight additional distance over the illustration shown in FIG. 2, in somewhat of an exaggerated manner, with respect to the reference datum on disc 4.

Under the foregoing circumstances, it will be seen that since the teeth are wedge-shaped, only the approximate position of discs 1 and 2 need be established incident to arriving at an angular setting between discs 1 and 4, for example. Such position easily can be seen and arrived at by the unaided eye.

EXAMPLE OF OPERATION

Consider first the operation of the minimum set of 3 discs, 1, 2 and 3, as illustrated in FIG. 5, and disregarding disc 4. Assigning pitch A the value of 1 degree 0 minutes 0 seconds and pitch B, 1 degree 1 minute 0 seconds. Starting at the zero position as illustrated in FIG. 1 and keeping disc 3 rotationally stationary throughout the whole sequence:

Step (1) all discs are separated as illustrated in FIG. 5.

Step (2) keeping disc 1 in approximately the same rotational position, rotate disc 2 counterclockwise approximately one pitch B.

Step (3) compress the discs as shown in FIG. 6.

Since the teeth are wedge-shaped, only the approximate positions of discs 1 and 2 need be established, a position easily seen by the unaided eye. Upon compression, disc 1 will rotate counterclockwise the difference between pitch A and B, which is 1 minute. The process can be repeated until the 59th pitch B has been positioned operatively, at which time disc 1 will have been rotated 59 minutes and disc 2 will have rotated 59 degrees and 59 minutes. For the next step, disc 2 is returned to its original position providing a total movement of 60 minutes of disc 1 and the ratcheting action previously mentioned, which when repeated for each of the remaining 359 degrees, will rotate disc 1 the full circle in 1 minute intervals.

It will be evident from the foregoing that by providing a datum line such as that shown in FIGS. 1–3, an operator can easily align the discs at random, such as illustrated in FIG. 2, in which the 1 degree mark is just past the datum line, placing the datum line between the 1 and 2 degree marks and aligning the 15 minute pitch mark with the reference line. When the discs are compressed, a 1° 15′ angle of movement is established between discs 1 and 3. Accordingly, with no intermediate steps and no calculations, an inexperienced person can set at random the mechanism in a matter of a very brief interval of time so that disc 1 is disposed at a desired angular position with respect to the base disc 4.

By adding disc 4 to the set, disc 3 becomes the adapter, linking disc 2 to disc 4 and performs the same function in the same manner as disc 2 in the set of discs 1, 2 and 3. Assigning pitch C the value of 1° 1′ 1 inch it is then possible to divide in increments of one second, and also just as easily align the discs at random, such as in FIG. 3 wherein a reading of 1 degree 15 minutes 2 seconds is shown. One could then add additional discs and employ the same method of operation, the only limitation in such further subdivision being that the same must be measurable and producable. Since in the addition of discs the action remains limited to three discs in the stack for each increment of division, and the remaining discs of the stack function as a solid connected unit, the overall accuracy is not affected by accumulated error. For example, if in the set of four discs previously described, a 5th disc was added to divide the 1 second movement into tenths, making the pitch one degree, one minute, one and one tenth seconds, the incremental shift of 1/10 second would not affect or be affected by the accuracy of the rest of the stack. Therefore, since there are only 360 + 60 + 60, equalling 480 relative positions of the rest of the stack, it is economically feasible to chart the deviation in each of these positions and compensate for it, plus or minus 3 seconds in increments of 1/10 second, with an approximate travel of 30 degrees in either direction by disc 4.

It also will be obvious that the pitch values of pitches A, B and C could be based on decimals or any other ratio desired by employing the same method of variations between the pitches as generally described hereinabove. This would result in producing the same ease of operation in such modified application of the basic principles of the invention. It is only necessary that on those discs on which the indicia are not evenly divisable, to allow sufficient clearance for the override of the teeth which would not mesh properly if at all, allowing the needed ratchet and camming movement.

Referring to FIGS. 5 and 6, it also will be seen that it is not necessary to have certain of the pitches, such as pitches B and C to extend over an entire circle. Segments of substantially less than 360° will be adequate and will function with no loss of divisional capacity or otherwise impede or interfere with the operation over the range of the segment. Such segments are illustrated in exemplary manner in FIG. 4 and also in FIGS. 5 and 6.

Although discs having engaging sets of teeth on opposite faces have been shown and adapter disc 2 is shown between discs 1 and 3, it is not desired to limit the invention to this construction even though it may be desired from a standpoint of strength. Also, rather than employ discs or rings, relatively straight bars or strips may be used which have teeth of the type referred to on one or more side edges. Such arrangement can be visualized from FIGS. 1–3 by considering the side elevations of the discs actually shown therein as such bars or strips. Interruptions in the rows of teeth corresponding to the scales of smaller divisions of angles are provided, as in regard to the disc type embodiments, and similarly, the teeth on one of said scales have a pitch not evenly divisible into a given length corresponding to the length of the principal scale.

For certain applications, for example, in the embodiments using discs, a thinner stack than in FIGS. 1–6 may be desired. Examples of other configurations of discs and the arrangement of teeth thereon can be used. Examples of suitable arrangements of the type referred to are shown in FIGS. 7–12, details of which are as follows:

In FIGS. 7–9, a compact arrangement of annular members 10, 12 and 14 are shown in which member 10 is the adaptor member and has 2 series of teeth 16 and 18 thereon which are coaxial and preferably separated by a space 20. For example, the row of teeth 16 correspond to the teeth A on disc 1 of FIGS. 1–3, 5 and 6. For example, the teeth thereon each represent one degree of a circle and a scale indicating the same is provided on the outer circumferential surface 22 of member 10. The teeth 24 on member 12 correspond in pitch to and mesh with teeth 16 on member 10. The pitch of teeth 18 on member 10 correspond, for example, to the pitch of teeth B on disc 2 of FIGS. 1–3, 5 and 6 and, for example, represent minutes of a degree of a circle, as described hereinabove relative to teeth B of said figures.

Also, as in regard of said teeth B, the teeth 18 are interrupted by a space 26, shown in FIG. 9, said space extending for an arc of between about 20° and 60° of the circumference, as in regard to teeth B of FIGS. 1–3, 5 and 6, to accommodate the nonuniform tooth 28 of the series of teeth 30 on member 14, the pitch of which is not evenly divisible into a circle, thereby resulting in the odd width tooth 28 which, when disposed in space 26 of the teeth 18 of member 30, will enable the teeth 30 of member 14 to mesh with the teeth 18 of member 10 in a manner to advance member 14 a desired increment of one pitch of the teeth 24 of member 12 in accordance with the scale 32 on the inner peripheral surface of member 14. Suitable means, not shown, serve to clamp the members 12 and 14 axially relative to member 10 and it will be seen that member 10 corresponds to disc 2 of FIGS. 1–3, 5 and 6, while member 12 corresponds to disc 1 of said figures and member 14 corresponds to disc 3 of said figures.

Referring to FIGS. 10–12, a different 3-ring embodiment of the invention from that shown in FIGS. 7–9 is shown and in which the rings comprise annular members adapted to be meshed concentrically with each other. Basically, the operation of and results produced by both these embodiments are similar except that, for certain installations and adaptations to space requirements, or otherwise, one of these embodiments may be preferable over the other. In FIGS. 10–12, the central ring or member 34 is the adaptor member and is annularly frusto-conical. On the outer conical periphery of member 34, a continuous series of teeth 36 of uniform pitch are provided, which correspond to degrees of a circle, for example, while on the inner peripheral conical surface of member 34, additional teeth 38 are formed which have a pitch that is not evenly divisible into a circle and, for example, correspond to minutes of a degree of a circle, as in regard to teeth 18 on member 10 of FIGS. 7–9 and teeth B on disc 2 of FIGS. 1–3, 5 and 6.

The teeth 38 are preferably arranged in a series separated by space 40, as shown on member 34 in exemplary manner in FIG. 12. The teeth 36 on member 34 mesh with a complementary set of teeth 42 on outer circular member 44 which also correspond to degrees of a circle. A scale 54 on one face of member 34 also corresponds to degrees of a circle, for direct visible reading, and a Zero datum line, not shown, may be included, such as at Zero on the basic scale, to extend radially across said face of member 44. The teeth 42 comprise a continuous circle thereof, as in regard to teeth 36.

The innermost annular member 48 has a series of teeth 50 thereon which mesh with the teeth 38 on the inner periphery of adaptor member 34, whereby the surface of member 48 on which they are formed is frusto-conical to permit the meshing of the teeth 50 with teeth 38. However, the pitch of teeth 50, like teeth 38, is not evenly divisible into a circle, whereby there is a non-uniform tooth 52 in the series of teeth 50 which is accommodated within the space 40 on member 34 during any particular setting of said members. This permits meshing of teeth 50 with corresponding teeth 38 when the members 34 and 48 are moved axially toward each other and are clamped in meshing relationship by suitable means, not shown, such as when member 44 also is meshed with member 34 by the same clamping means. Scales 54 also preferably are provided on the upper surfaces of members 34 and 48 to permit direct reading of minutes of a degree of a circle.

Hence, it will be seen that a desired angle readily may be precisely and quickly effected between two members, not shown, on a machine tool of some kind or geometrical instrument, for example, or the like, to which members 12 and 14 of the embodiment of FIGS. 7–9 respectively are connected or to which members 44 and 48 of the embodiment of FIGS. 10–12 respectively are connected. Ease of operation and the direct reading of the scales of the various interrelated members is apparent from the foregoing descriptions and illustrations in the drawings, whereby even a novice with only very limited preliminary instructions can effect precise angular settings between two associated members adapted to be disposed at desired adjustable angles relative to each other.

It also should be understood that while the embodiments shown in FIGS. 7–9 and FIGS. 10–12 only illustrate three intermeshing members operable to effect or achieve an angular setting, such as degrees of an angle and a further division of one degree thereof into minutes, for example, or decimal divisions of an angle or the like, further smaller division of such angles such as by dividing minutes into seconds, etc., may be accomplished by suitably adding additional members and appropriate teeth, as described above relative to disc 4 in FIGS. 1–3, 5 and 6, for example, for cooperation with the basic members shown in the embodiments of FIGS. 7–12.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. An indexing mechanism comprising at least three relatively movable members, the first and second of said members each having a set of teeth respectively of different pitches, at least one of said pitches not being evenly divisible into a predetermined dimension corresponding to the dimension of the other pitch, and the third member being an adaptor member for the other two and having two sets of teeth thereon respectively complementary to and meshingly coengageable with the teeth on each of said first and second members, said members all being separable to disengage said teeth thereon to permit relative movement between said members to establish a new predetermined meshing position between said first, second and third members, and thereby provide a desired relative position between said first and second members.

2. An indexing mechanism according to claim 1 in which said first member is provided with a datum line relatively stationary thereto, and said other members having visible scales thereon proportional to the pitches of the teeth respectively thereon to enable direct relative positioning of said members relative to each other and afford direct reading of the relative position of said members with said datum line.

3. The indexing mechanism according to claim 2 in which said first and second members are adapted to be affixed respectively to a base and an element adapted to be moved relative to said base to establish a desired positional relationship therewith as determined by the visible scales and sets of meshing teeth upon said members.

4. The indexing mechanism according to claim 2 in which said teeth extend radially thereon and are positioned annularly for the purpose of positioning said members in relatively different rotational positions about a common axis, and said one of said pitches which is not evenly divisible into a predetermined dimension is not evenly divisible into a circle, thereby producing a tooth of irregular width in said set of teeth on said one member, and providing a segment of clearance for said irregular tooth in the set of teeth on the meshingly coengageable adjacent member sufficient to allow a variety of completely engaged rotational positioning between said one member and said meshingly coengageable adjacent member.

5. The indexing mechanism according to claim 4 in which said members are disc-like and adapted to be stacked axially, and the meshing teeth thereon are on the inner faces of the outermost members and the opposite faces of the member or members therebetween.

6. The indexing mechanism according to claim 4 in which said members are annular and said adaptor member having a radial width adequate to subtend the other two members for common positioning thereof against one face of said adaptor member, said other two members being concentric and said one face of said adaptor member having two sets of teeth of relatively different pitches concentrically arranged thereon and complementary to and coengageable with the sets of teeth respectively provided on the faces of said concentric members which are adjacent to said adaptor member.

7. The indexing mechanism according to claim 4 which further comprises a set of concentric annular members, the intermediate member or members of said set being adaptor members which are annularly frusto-conical and the sets of teeth on the opposite inner and outer edges thereof respectively sloping to one face of said member, and the sets of teeth on the innermost and outermost members respectively sloping complementarily to the sets of teeth on said adaptor member with which they are adapted to mesh when a desired setting is established between said innermost and outermost members and said teeth are clamped in engagement with each other.

8. The indexing mechanism according to claim 4 in which one or more of said members consist of a segment of less than a full circle but having teeth of a pitch which if continued for a full circle would not be evenly divisible into the circle and thereby produce an irregular tooth.

* * * * *